United States Patent [19]

Kikuchi

[11] Patent Number: 5,124,836
[45] Date of Patent: Jun. 23, 1992

[54] REAL IMAGE MODE FINDER OPTICAL SYSTEM

[75] Inventor: Juro Kikuchi, Uenohara, Japan

[73] Assignee: Olympus Optical Co., Ltd., Tokyo, Japan

[21] Appl. No.: 631,491

[22] Filed: Dec. 21, 1990

[30] Foreign Application Priority Data

Dec. 25, 1989 [JP] Japan .................... 1-335366

[51] Int. Cl.$^5$ ............... G02B 23/02; G02B 23/14; G02B 15/00; G02B 13/06; G02B 26/00; G02F 1/19

[52] U.S. Cl. .................... 359/422; 359/432; 359/732; 359/676; 359/665; 359/497; 359/492; 359/94; 359/73; 359/70; 359/40

[58] Field of Search .......... 350/560, 570, 411, 423, 350/418, 446, 347 R, 347 V, 385, 388, 391, 400, 403

[56] References Cited

U.S. PATENT DOCUMENTS

| | | | |
|---|---|---|---|
| 3,876,875 | 4/1975 | Velzel | 350/503 |
| 4,037,929 | 7/1977 | Bricot et al. | |
| 4,108,539 | 8/1978 | Gort et al. | 350/505 |
| 4,190,330 | 2/1980 | Berreman | |
| 4,407,567 | 10/1983 | Michelet et al. | 350/423 |
| 4,601,545 | 7/1986 | Kern | 350/347 V |
| 4,758,070 | 7/1988 | Nishimoto | 350/379 |
| 4,783,152 | 11/1988 | Nishimoto | 350/379 |
| 4,812,030 | 3/1989 | Pinson | 350/505 |
| 4,904,063 | 2/1990 | Okada et al. | 350/347 V |
| 4,906,078 | 3/1990 | Inabata et al. | |
| 4,919,520 | 4/1990 | Okada et al. | 350/347 V |
| 4,981,342 | 1/1991 | Fiala | 350/379 |

FOREIGN PATENT DOCUMENTS

| | | |
|---|---|---|
| 1552198 | 11/1968 | France ............ 350/379 |
| 52-32348 | 9/1976 | Japan . |
| 54-99654 | 8/1979 | Japan . |
| 59-224820 | 12/1984 | Japan . |
| 61-77820 | 4/1986 | Japan . |
| 61-221720 | 10/1986 | Japan . |
| 61-50281 | 11/1986 | Japan . |
| 62-56918 | 3/1987 | Japan . |
| 62-170993 | 7/1987 | Japan . |
| 64-13034 | 1/1989 | Japan . |
| 1-131510 | 5/1989 | Japan . |
| 1-197717 | 8/1989 | Japan . |

*Primary Examiner*—Jon W. Henry
*Attorney, Agent, or Firm*—Cushman, Darby & Cushman

[57] ABSTRACT

A real image mode optical system includes an objective lens forming an image of an object and an eyepiece for observing the image and is provided with a variable focal length mirror which dispenses with any polarizing plate so that a diopter change can be corrected due to the change of its optical power. Accordingly, the real image mode optical system has many advantages important for practical use that the reduction of the amount of light is slight, the characteristics are little changed by gravity, the number of parts is small with low manufacturing costs, the strain of the lens and the like of the optical system is not viewed, aberrations are little produced, and the effective aperture of the entire optical system can be set at a minimum.

7 Claims, 4 Drawing Sheets

WIDE ANGLE POSITION

STANDARD ANGLE POSITION

TELE ANGLE POSITION

FIG. 3

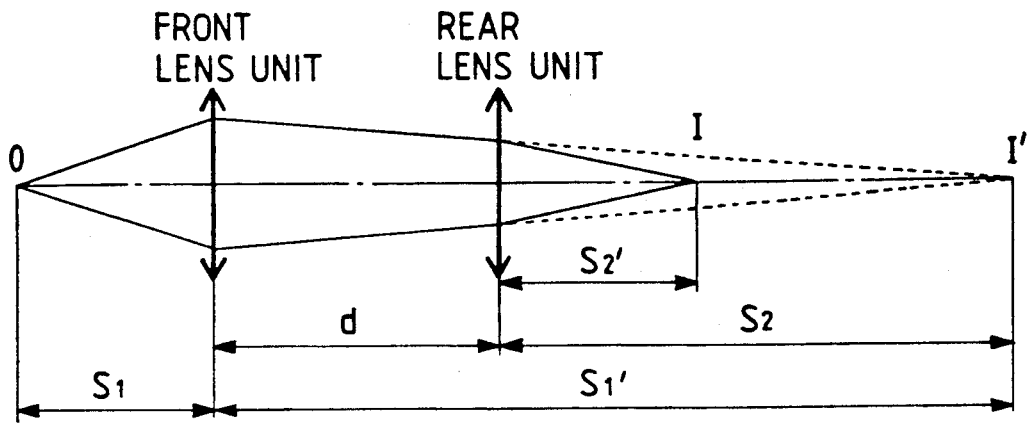

$$\beta = \frac{S_1' \cdot S_2'}{S_1 \cdot S_2} = \frac{S_1' \cdot S_2'}{S_1(S_1'-d)} = \frac{S_2' \cdot S_1'}{S_1(S_1'-d)}$$

FIG. 4

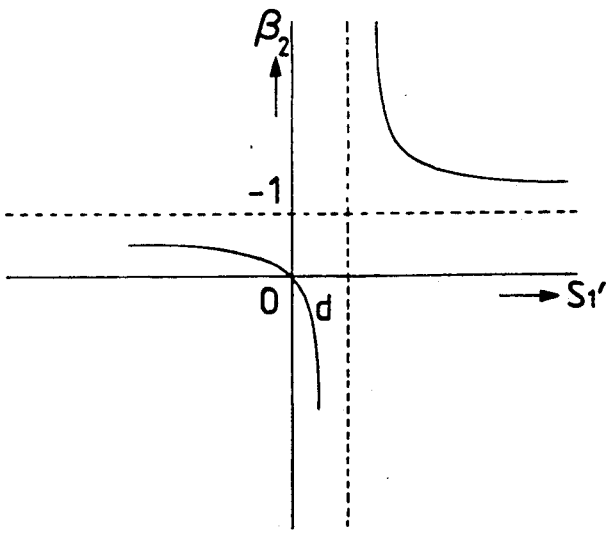

$\beta = \beta_1 \cdot \beta_2$ $\beta_1 = \dfrac{S_2'}{S_1} = $ CONSTANT $\beta_2 = \dfrac{S_1'}{S_1'-d}$ ① IF $S_1' > d$, THE ABSOLUTE VALUE OF $\beta$ INCREASES AS $S_1'$ BECOMES CLOSE TO d.

② IF $d > S_1' > 0$, THE ABSOLUTE VALUE OF $\beta$ INCREASES AS $S_1'$ BECOMES CLOSE TO d.

③ IF $0 > S_1'$, THE ABSOLUTE VALUE OF $\beta$ INCREASES AS $S_1'$ BECOMES CLOSE TO $-\infty$.

REAL IMAGE MODE FINDER OPTICAL SYSTEM

BACKGROUND OF THE INVENTION a) Field of the Invention

This invention relates to a real image mode finder optical system.

b) Description of the Prior Art

The real image mode finder optical system can bring about a large magnification ratio from an adequate design, but nevertheless can diminish an effective aperture of the lens system and particularly the diameter of a front lens, so that it is largely used for a zoom finder. Further, the real image mode finder optical system, needs some optical element to erect an image, which is broadly classified as a prism or a relay lens.

The variable magnification finder set forth in Japanese Patent Preliminary Publication No. Hei 1-131510, for instance, is the zoom finder making use of a Porro prism to erect the image. This arrangement is made so that the change of magnification is accomplished by a second lens unit and the correction of dipter by a thrid lens unit, thus having two moving lens units.

In addition to this, the use of a Dach prism and a mirror according to the optical path length and the layout of the arrangement is also known.

Also, like the variable magnification finder stated in Japanese Patent Preliminary Publication No. Hei 1-197717, the arrangement in which the correction of diopter is performed by a first lens unit and the change of magnification by a second lens unit is also available. Further, in the case of the mounting of the optical system, the method using the relay lens brings about increase of the overall length and therefore causes often the optical path to be bent by the mirror, with a view to incorporating effectively the optical system in a camera, like the finder stated in Japanese Utility Model Preliminary Publication No. Sho 64-13034, although not used exclusively for the finder. In this example, the lens system provided in front of the mirror is also used as a photographic lens system so that the change of magnification and the correction of diopter are attained by moving the plural lens units of the photographing lens system.

Each arrangement, however, described in the Hei 1-131510, Sho 64-13034 and Hei 1-197717 has two or more moving lens units as mentioned above and requires a driving mechanism such as a cam with resultant complicated design and manufacture.

In particular, the optical system employing the relay lens as described in each of the Sho 64-13034 and Hei 1-197717 requires to turn back the optical path when being intended for compaction, with the result that a return mirror will be required and the number of parts will be increased.

Although the number of parts may be reduced if the return mirror is moved to become a compensator, the direction of movement of the return mirror is complicated because the optical path is intricate and a device of avoiding the interference of the parts to be moved is required, thus making the design and manufacture difficult.

As such, it is proposed that a variable focal length lens, although not used yet in the real image mode finder optical system, is adopted in place of the moving lens unit.

For example, the variable magnification finder optical system set forth in Japanese Patent Preliminary Publication No. Sho 62-56918 is such that the lens units for the correction of diopter are replaced by the variable focal length lens into a single moving lens unit. Moreover, in each of an inverse Galilean finder stated in Japanese Patent Preliminary Publication No. Sho 61-77820, the variable magnification finder in Japanese Patent Preliminary Publication No. Sho 61-221720, and the lens in Japanese Patent Publication No. Sho 61-50281, the lens units for the change of magnification and the correction of diopter are replaced by the variable focal length lens to dispense with the moving lens units.

The foregoing Sho 61-77820, Sho 61-221720, and Sho 61-50281, however, involve problems that, since the change of the refracting power is made by the variation of the lens configuration, high electric energy will be consumed in order to maintain the lens configuration while being changed and deformation by gravity will be brought about. Furthermore, the arrangement stated in each of the Sho 61-77820 and Sho 61-221720 has encountered difficulties that, unless the lens has the transmittance equivalent to optical glass since it is necessary to be constructed with material corresponding to the thickness of the lens, the visual field of the finder colors, becomes dark, and fades.

Hence, the variable focal length lens designed so that the refracting power is changed by making use of the birefringent property of a liquid crystal to adjust a voltage applied from the external has been already proposed by Japanese Patent Preliminary Publication Nos. Sho 52-32348, Sho 54-99654, and Sho 59-224820.

As an example, a variable focal length liquid crystal lens stated in the foregoing Sho 59-224820 is used in such a way that the vibrating direction of a polarizing plate coincides with the direction of the longitudinal axis (optic axis) of liquid crystal molecules in an initial orientation of the liquid crystal. It follows from this that, in the state where the voltage is not applied, the liquid crystal lens exhibits the refracting power with respect to an extraordinary ray, while in the state where the voltage is sufficiently applied, enclosed liquid crystal molecules rotate to become parallel with the electric line of force and an apparent refracting power changes so that the lens exhibits the refracting power with respect to an ordinary ray. Further, in the intermediate application of voltage, it is possible to change continuously the refracting power in accordance with the value of the applied voltage.

Also, in Japanese Patent Preliminary Publication No. Sho 62-170933, a variable focal length mirror lens is proposed as not a transmission type but a reflection type.

Such a variable focal length lens utilizes its birefringent property, not to speak of the liquid crystal lens, and therefore is combined with the polarizing plate in general. Whereby, ordinary and extraordinary rays are separately used to derive the effect of the variable focal length. Unless the polarizing plate is employed, in the case of a positive lens by way of example, the light subjected to the refracting power relating to the ordinary ray and the light subjected to the refracting power relating to the extraordinary ray form two focal points, resulting in generation of a double image. For this reason, the polarizing plate has been indispensable for most of the variable focal length lenses.

In such conventional variable focal length lenses, however, there has been the defect that light (the amount of light) usable for the polarizing plate is reduced to a half of the required amount, with the resultant narrow range of use. For instance, the finder optical system set forth in the above Sho 62-56918 has had the defect that the visual field of the finder becomes dark because the polarizing plate is employed for the variable focal length lens.

Further, when light deviating from the direction of polarization is made incident, this optical system may change to the optical system having the same characteristics as the one including a polarizer and an analyzer. In such a case, the strain of the lens and the like of the optical system may also be viewed, so that there is the demand of general use of non-polarized light. The lens involving the conventional polarizing plate has been unable to fill this demand.

Moreover, a lens made with a birefringent material so that the optical axis of the lens is not parallel with the optic axis of the material has such a defect as to exhibit astigmatism even on the axis and a lens configuration free of aberration has been demanded.

In addition, any of the optical systems stated in the Sho 62-56918, Sho 61-77820, and Sho 61-221720 is based on the Galilean optical system or the inverse Galilean optical system and has also encountered the problem that, since the effective aperture becomes large with increasing magnification ratio, the optical system cannot be used for the design of a high magnification ratio.

SUMMARY OF THE INVENTION

It is, therefore, the object of the present invention to provide a real image mode finder optical system in which the reduction of the amount of light is minimized, the variation of characteristics by gravity is little, a small number of parts makes cost low, the strain of the lens and the like of the optical system is not viewed, aberrations are little produced, and the effective aperture of the entire optical system can be set at a minimum.

This object is accomplished, according to the present invention, by the arrangement that, in the real image mode finder optical system comprising an objective lens for forming an image of an object and an eyepiece for observing the image, the finder optical system is equipped with a liquid crystal type variable focal length mirror combined with a quarter-wave plate so that diopter change is corrected by the variation of the optical power of the variable focal length mirror.

According to the present invention, the variable focal length mirror functions as a compensator which does not move and consequently the number of parts is diminished. Further, the liquid crystal type variable focal length mirror combined with the quarter-wave plate utilizes natural light as a whole, so that, unlike the conventional variable focal length mirror involving the polarizing plate, the reduction of the amount of light is slight and the strain of the lens and the like of the optical system is not viewed. Moreover, since the layer of the liquid crystal is thin, the absorption of light is minimized and astigmatism is little produced. In this liquid crystal type variable focal length mirror, a driving power is low and the characteristics will not be changed by gravity. If distances among lens units are set to be practically afocal, the magnification change of an imaging system is slight even in the adjustment of the distances and a pupil position can be altered with comparative freedom, so that the effective aperture of the entire optical system can be set at a minimum.

This and other objects as well as the features and the advantages of the present invention will become apparent from the following detailed description of the preferred embodiment when taken in conjunction with the accompanying drawings.

BRIEF DESCRIPTION OF THE DRAWINGS

FIGS. 3 to 6 are explanatory views showing that it is more advantageous that a fourth lens unit is constructed as the variable focal length mirror in the embodiment.

DESCRIPTION OF THE PREFERRED EMBODIMENT

Figure 1A:
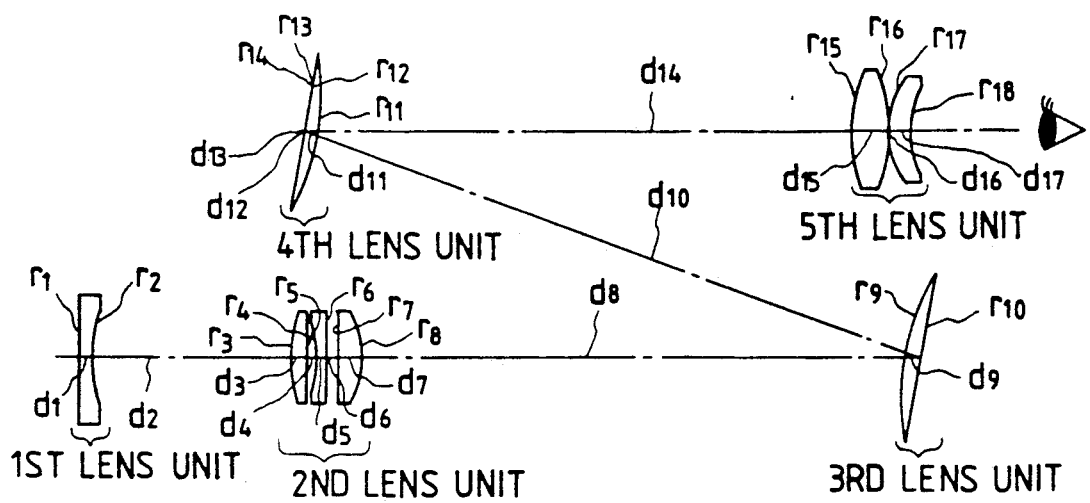
FIGS. 1A-1C are views showing the arrangement of one embodiment of the real image mode finder optical system according to the present invention and the states in wide, standard and tele positions thereof.

In accordance with one embodiment shown in the drawings, the present invention will be described in detail below.

EMBODIMENT

Figure 1B:
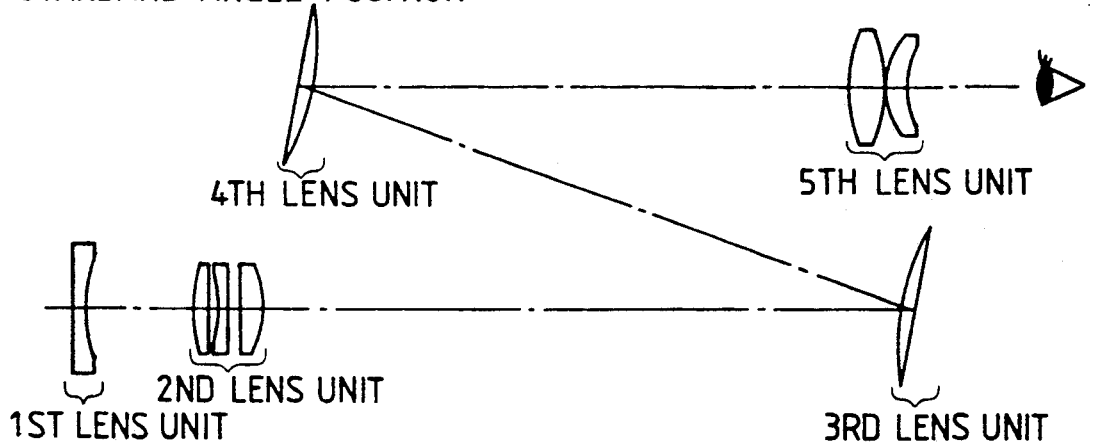
Figure 1C:
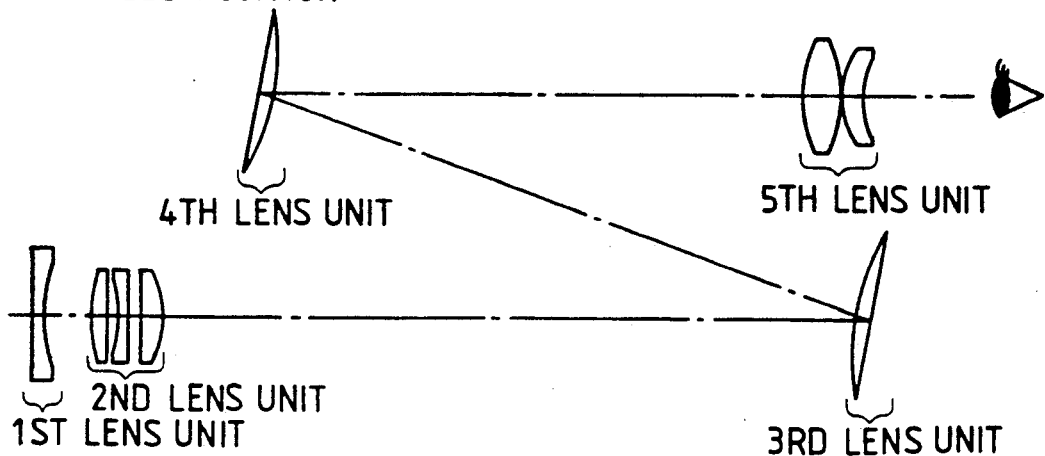

FIGS. 1A-1C show the arrangement of the optical system of this embodiment and the states in wide, standard and tele positions.

Its data are as follows:

| Radius of curvature | Airspace | Refractive index | Abbe's number |
|---|---|---|---|
| $r_1 = -193.17$ | | | |
| | $d_1 = 1.56$ | $n_1 = 1.49216$ | $\nu_1 = 57.5$ |
| $r_2 = 19.61$ | | | |
| | $d_2 = $ variable | | |
| $r_3 = 27.01$ | | | |
| | $d_3 = 2.00$ | $n_2 = 1.72916$ | $\nu_2 = 54.7$ |
| $r_4 = -70.25$ | | | |
| | $d_4 = 1.21$ | | |
| $r_5 = -13.20$ | | | |
| | $d_5 = 1.34$ | $n_3 = 1.80518$ | $\nu_3 = 25.4$ |
| $r_6 = -56.34$ | | | |
| | $d_6 = 1.00$ | | |
| $r_7 = 60.59$ | | | |
| | $d_7 = 3.00$ | $n_4 = 1.49216$ | $\nu_4 = 57.5$ |
| $r_8 = -11.12$ (aspherical) | | | |
| | $d_8 = $ variable | | |
| $r_9 = 40.96$ | | | |
| | $d_9 = 1.00$ | $n_5 = 1.51633$ | $\nu_5 = 64.2$ |
| $r_{10} = \infty$ (reflecting surface) | | | |
| | $d_{10} = 78.65$ | | |
| $r_{11} = 33.76$ | | | |
| | $d_{11} = 1.00$ | $n_6 = 1.49216$ | $\nu_6 = 57.5$ |
| $r_{12} = -37.30$ [Fresnel lens surface (liquid crystal layer)] | | | |
| | $d_{12} = 0.01$ | $n_7 = 1.5\text{-}1.7$ | $\nu_7 = 35\text{-}20$ |
| $r_{13} = \infty$ (quarter-wave plate) | | | |
| | $d_{13} = 0.01$ | $n_8 = 1.6$ | |
| $r_{14} = \infty$ (reflecting surface) | | | |
| | $d_{14} = 69.95$ | | |
| $r_{15} = 34.77$ | | | |
| | $d_{15} = 3.92$ | $n_9 = 1.49216$ | $\nu_8 = 57.5$ |
| $r_{16} = -34.77$ | | | |
| | $d_{16} = 0.15$ | | |
| $r_{17} = 15.66$ (aspherical) | | | |
| | $d_{17} = 2.94$ | $n_{10} = 1.49216$ | $\nu_9 = 57.5$ |
| $r_{18} = 19.36$ | | | |

Aspherical coefficient
8th surface $\quad a_4 = 0.99800 \times 10^{-4}$,
$\quad a_6 = -0.27700 \times 10^{-6}$.

-continued

17th surface
$a_8 = 0.90600 \times 10^{-8}$
$a_4 = -0.12198 \times 10^{-4}$
$a_6 = -0.43095 \times 10^{-7}$
$a_8 = -0.32416 \times 10^{-9}$ Aspherical surface equation $$z = y^2/r(1 - \sqrt{1 - y^2/r^2}) - \sum_{i=2}^{4} a_{2i}y^{2i}$$

Here, first and second surfaces (r1 and r2) correspond to a first lens unit, third to eighth surfaces (r3 to r8) to a second lens unit, and ninth and tenth surfaces (r9 and r10) to a third lens unit. The tenth surface of the third lens unit is configured as a reflecting surface, at which the optical path is bent on the side of the first lens unit. Eleventh to fourteenth surfaces (r11 to r14) correspond to a fourth lens unit which is the variable focal length mirror comprising a liquid crystal lens, and the fourteenth surface (r14) is configured as the reflecting surface, at which the optical path is bent on the opposite side of the first lens unit (toward a fifth lens unit). Fifteenth to eighteenth surfaces (r15 to r18) constitute the fifth lens unit.

The paraxial arrangement of this embodiment is as shown in Table 1.

TABLE 1

| State | | 1st lens unit | 2nd lens unit | 3rd lens unit | 4th lens unit | 5th lens unit | γ | diopter |
|---|---|---|---|---|---|---|---|---|
| Wide | Focal length | −36.08 | 23.03 | 40.00 | 35.14 | 27.28 | 0.621 | −0.504 |
| | Principal pt. distance | | 29.79 | 68.99 | 80.00 | 66.91 | | |
| Standard | Focal length | −36.08 | 23.03 | 40.00 | 40.00 | 27.28 | 0.951 | −0.507 |
| | Principal pt. distance | | 19.42 | 79.36 | 80.00 | 66.91 | | |
| Tele | Focal length | −36.08 | 23.03 | 40.00 | 43.10 | 27.28 | 1.366 | −0.509 |
| | Principal pt. distance | | 11.19 | 87.59 | 80.00 | 66.91 | | |

The first lens unit is fixed during the change of magnification, the second lens unit varies the magnification by moving along the optical axis, the third lens unit is also fixed during the change of magnification, the fourth lens unit, although spatially fixed during the change of magnification, is such that the optical power changes to maintain constantly the diopter, and the fifth lens power is fixed during the change of magnification. Also, the distance between the third lens unit and the fourth lens unit is set to be afocal. Reference symbol γ represents the angular magnification of the entire system.

Also, airspaces d2 and d8 change as shown in Table 2.

TABLE 2

| | Airspace | |
|---|---|---|
| State | d2 | d8 |
| Wide | 24.35 | 66.96 |
| Standard | 13.98 | 77.32 |
| Tele | 5.75 | 85.56 |

Figure 2:
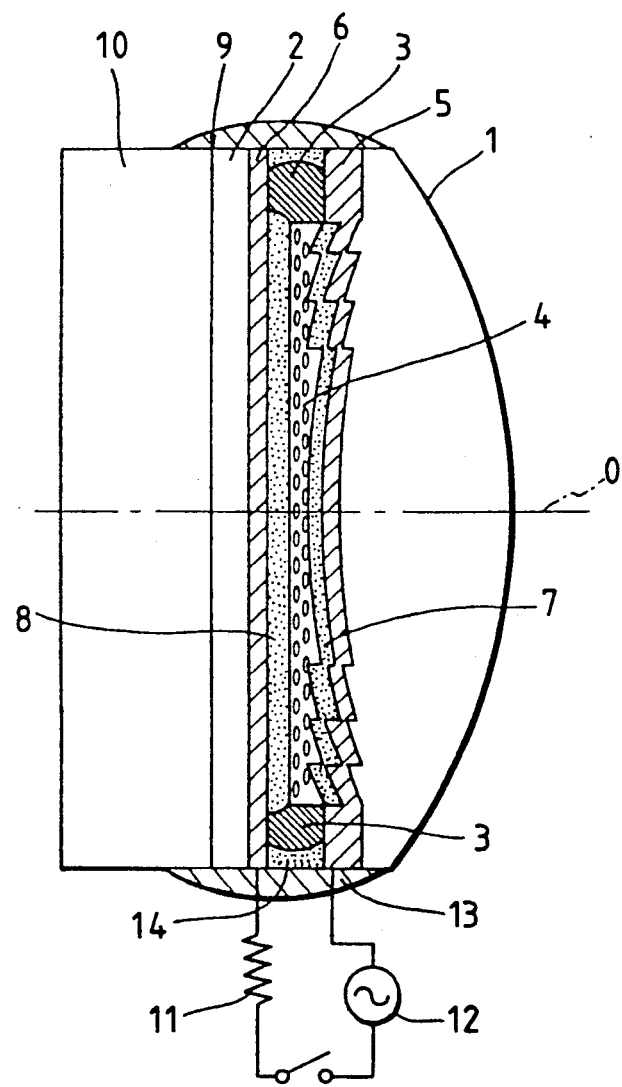
FIG. 2 is a sectional view of a variable focal length mirror of the above embodiment.

FIG. 2 shows a detailed structure of the variable focal length mirror which is the fourth lens unit of the embodiment. It comprises a nematic liquid crystal 4 which is an optical material exhibiting the birefringent property, enclosed in a Fresnel lens-shaped space formed by cementing together a transparent substrate 1 and a quarter-wave plate 2 through an insulating spacer 3. Between the transparent substrate 1 and the quarter-wave plate 2 are formed ITO transparent conductive layers 5, 6 and liquid crystal orientation films 7, 8 of polyvinyl alcohol. A reflecting mirror 9 is provided on the opposite side of the liquid crystal layer with respect to the quarter-wave plate 2 and a substrate 10 for supporting the quarter-wave plate 2 is further provided in such a manner that the reflecting mirror 9 is sandwiched between them. Reference numeral 13 represents a sealing material and 14 denotes an adhesive, by which the liquid crystal 4 after being injected into the space is sealed. The transparent conductive layers 5, 6 are constructed so that a voltage can be applied, between them, from an alternating voltage source 12 through a resistor 11 for voltage adjustment and so that the refracting power of the liquid crystal 4 can be controlled by adjusting the voltage being applied between the transparent conductive layers.

That is, when the applied voltage is zero, as shown in FIG. 2, the longitudinal axis of each liquid crystal molecule is substantially normal to an optical axis O of the optical system, and a polarized light component following a vibrating direction parallel to the longitudinal axis of the liquid crystal molecule, of natural light incident on the variable focal length mirror, is subjected to a strong refracting action at the time of its incidence in virtue of the liquid crystal layer. When it traverses the quarter-wave plate 2, is reflected from the reflecting mirror 9, and tranverses again the quarter-wave plate 2, it is converted into a polarized light component following the vibrating direction normal to the longitudinal axis of the liquid crystal and is subjected to a weak refracting action at the time of its emergence by the liquid crystal layer. Further, although a polarized light component normal to the longitudinal axis of the liquid crystal, of the incident natural light, is subjected to only a weak refracting action on the incidence by the liquid crystal layer, it is already converted into a polarized light component in a normal vibrating direction on the emergence in virtue of the behavior of the quarter-wave plate 2, so that it is subjected to a strong refracting action by the liquid crystal layer. In either case, therefore, the incident light will be subjected to a strong refracting action.

When the applied voltage is high, on the other hand, the longitudinal axis of each liquid crystal molecule becomes parallel to the optical axis O of the optical system so that the polarized light component in any vibrating direction, of the natural light incident on the variable focal length mirror, is subjected to only a weak refracting action in either of the incidence or the emergence.

When the applied voltage is low, the polarized light component is subjected to the refracting action as an approximate average of the cases where the applied voltage is zero and high.

Individual states mentioned above are shown in Table 3.

TABLE 3

| State | Focal length | Refractive index | Applied voltage |
|---|---|---|---|
| Wide | 34.14 | 1.70000 | 0 |
| Standard | 40.00 | 1.63158 | Low |
| Tele | 43.10 | 1.50000 | High |

Also, the radii of curvature r11, r12, r13, and r14 of the eleventh, twelfth, thirteenth, and fourteenth surfaces correspond to those of the surface on the airspace side of the transparent substrate 1, the surface on the liquid crystal side of the transparent substrate 1, the surface on the liquid crystal side of the quarter-wave plate 2, and the surface of the reflecting mirror 9, respectively, and the ITO transparent conductive layers 5, 6 and the liquid crystal orientation films 7, 8 of polyvinyl alcohol have the radii of curvature equivalent to the above corresponding surfaces. Further, the airspaces d11, d12, and d13 among the eleventh, twelfth, thirteenth, and fourteenth surfaces and the refractive indices n11, n12, and n13 are the values relative to the transparent substrate 1, the liquid crystal layer 4, and the quarter-wave plate 2, respectively, and the thicknesses of the ITO transparent conductive layers 5, 6 and the liquid crystal orientation films 7, 8 of polyvinyl alcohol are so thin as to be negligible in the above data.

The embodiment is constructed as described above and the image point of the first and second lens units of the embodiment moves toward an object over the range from the wide position to the tele position. A compound focal length of the first and second lens units is 19.394 mm at the wide position and 34.279 mm at the tele position which changes 1.77 times that of the case of the wide position and this change is attributed to the change of magnification of the second lens unit.

The angular magnification $\gamma$ of the entire system, on the other hand, changes 2.20 times from 0.621-fold at the wide position to 1.366-fold at the tele position (refer to Table 1). The changes of the compound focal length and the magnification are caused by the magnification changes of the third and fourth lens units. This reason is that, since the fourth lens unit is constructed as the variable focal length mirror, the magnification change of the entire system has been made larger than that of the second lens unit.

If, contrary, the focal length of the fourth lens unit is fixed at 40 mm and the third lens unit is constructed as the variable focal length mirror, the angular magnification $\gamma$ of the entire optical system changes 1.39 times over the range from 0.858-fold at the wide position to 1.194-fold at the tele position and, as a result, the magnification change of the entire system will become smaller than that of the second lens unit.

Also, in the case of such a power arrangement that, in contrast to the embodiment, the image point of the first and second lens units moves toward the eye when the magnification varies from the wide position to the tele position, it is evident paraxially that the construction of the third lens unit as the variable focal length mirror is more advantageous to the magnification change.

The foregoing will now be explained in detail.

FIG. 3 shows the paraxial arrangement of two positive lenses (the third and fourth lens units in the embodiment) maintaining the imaging relationship of a finite distance between the object and the image. The distance between a front lens unit (the third lens unit) and an object point O is represented by S1, the principal point distance between two lenses (the third and fourth lens units) by d, the distance from the front lens unit to an image point I' of the front lens unit where a rear lens unit (the fourth lens unit) is neglected, by S1', the distance from the rear lens unit to the object point (I') of the rear lens unit where the front lens unit is neglected, by S2, and the distance from the rear lens unit to an image point I formed by both lens units, by S2'. In this case, a compound magnification $\beta$ of the preceding arrangement is calculated from the equation shown in the figure.

FIG. 4 depicts the situation where the positions of the object point O, two lens units and the image point I are constant and the focal length of the two lens units is varied to thereby change the compound magnification $\beta$. If the compound magnification $\beta$ is divided into a magnification $\beta 1$ caused by the front lens unit and a magnification $\beta 2$ by the rear lens unit, the magnificent $\beta 1$ will become constant and the change of the compound magnification $\beta$ will depend on only the change of the magnification $\beta 2$. As is evident from the figure, it is noted that the condition changes depending on whether the distance S1' is positive or negative.

Also, the meaning of $0 > S1'$ described in the figure is as follows:

In FIG. 3, when the object point O is closer to the front lens unit than the case where the value of the distance S1 coincides with the focal length of the front lens unit ($S1' = \infty$), the light beam passing through the front lens unit comes to divergent light with the resultant virtual image between the front lens unit and the object point O. That is, since the distance S1' exists before the front lens unit, it takes a negative value ($0 > S1'$).

Figure 5:
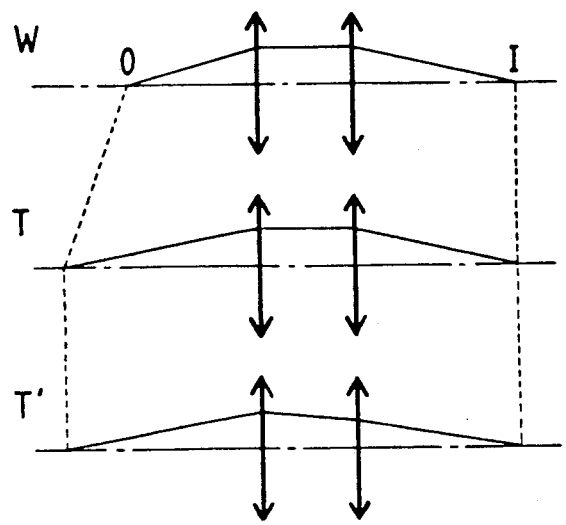
Figure 6:
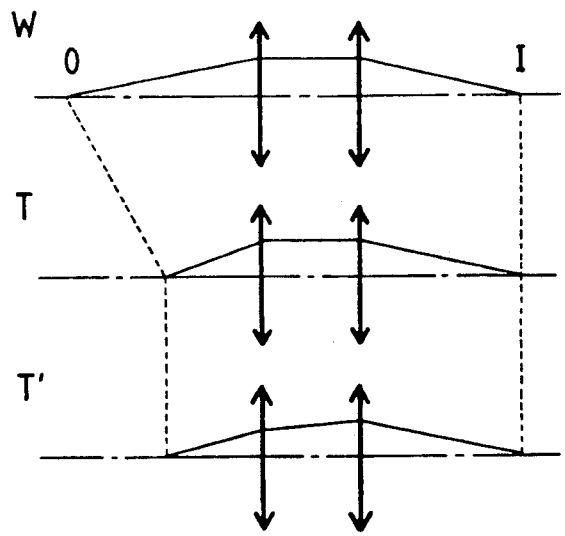

FIGS. 5 and 6 show the situations that when the object point O moves, three positions of the two lens units and the image point I are constantly maintained by changing the focal length of either lens unit. That the position of the image point I is constantly maintained in this manner is hereinafter referred to as the "correction for the image point position". In either FIGS. 5 or 6, the distance between the two lens units becomes afocal ($S1 = \infty$) in a wide position state W. Further, two tele position states T and T' shown in FIG. 5 each indicate the case where the object point O has moved toward the left and those in FIG. 6 each indicate the case where the object point O has moved toward the right. In either FIGS. 5 or 6, the state T shows that the focal length of the front lens unit has been altered and the state T' shows that the focal length of the rear lens unit has been altered.

Now, in FIG. 5, the magnification $\beta$ in the case of the state T will be compared with that of the state T'.

In this instance, if the correction for the image point position is made by the front lens unit, the value of the distance S1' will be infinitely maintained, while on the other hand, if the correction is made by the rear lens unit, the value of the distance S1' will be made positive.

Thus, from the discussion of FIG. 4, it is seen that the way of making positive the value of the S1', namely, the correction for the image point position by the rear lens unit causes the magnification $\beta$ of the system to be increased.

Next, in FIG. 6, the magnification $\beta$ in the case of the state T will be compared with that of the state T'.

In this case, if the correction for the image point position is made by the front lens unit, the value of the distance S1' will be infinitely maintained, whereas if the correction is made by the rear lens unit, the value of the distance S1' will be made negative. It is thus seen from the discussion of FIG. 4 that the way of maintaining infinitely the value of the distance S1', namely, the correction for the image point position by the front lens unit causes the magnification $\beta$ of the system to be increased.

Now, in the case where such a lens system is applied to the arrangement of the zoom lens, when the absolute value of the compound focal length of all the lens units located before the two lens units increases in virtue of the two lens units, it is desirable that the compound magnification of the two lens units becomes high and, contrary, even when the compound magnification diminishes, it is favorable that its diminishing extent is smaller since the magnification change of the entire system can be made large.

In this embodiment, the situation where the compound focal length of the third and fourth lens units is extended corresponds to that of FIG. 5 because the compound image point of the first and second lens units is shifted toward the object. In the embodiment, therefore, if the diopter is adjusted by either one of the third and fourth lens units, it is more favorable that the diopter adjustment is made by the fourth lens unit and, in fact, it has been done so.

Also, by changing properly the power of the third lens unit in accordance with the variation of the power of the fourth lens unit, a more advantageous magnification change is available.

Further, although the liquid crystal type variable focal length mirror in the embodiment has the negative power, the same effect is brougt about even in the combination with the liquid crystal type variable focal length mirror of the positive power.

The structure and function of the embodiment have been explained as the above. Briefly, in the embodiment, the variable focal length mirror of the fourth lens unit functions as the compensator which does not move, so that the number of parts is reduced. Further, since the liquid crystal type variable focal length mirror combined with the quarter-wave plate makes use of natural light as a whole, unlike the conventional variable focal length mirror involving the polarizing plate, the reduction of the amount of light is slight and the strain of the lens and the like of the optical system is not viewed. Moreover, since the layer of the liquid crystal is thin, the absorption of light is minimized and astigmatism is little produced. This liquid crystal type variable focal length mirror is such that a driving power is low and the characteristics are not changed by gravity.

For the optical system having considerable length as in the embodiment, the connection with the pupil is of importance. In the embodiment, since the distance between the third and fourth lens units is set to be substantially afocal, the change relative to the magnification of the imaging system is slight even though the distance between the third and fourth lens units is adjusted. As a result, the pupil position can be changed with comparative freedom by adjusting the distance between the third and fourth lens units, so that the effective aperture of the entire optical system can be set at a minimum.

What is claimed is:

1. A real image mode finder optical system, comprising:
   an objective lens;
   a first reflecting mirror reflecting light coming from said objective lens;
   a second reflecting mirror reflecting the light reflected from said first reflecting mirror in a direction substantially parallel with an optical axis of said objective lens; and
   an eyepiece disposed in a path of light reflected from said second mirror, so that an image formed by said objective lens is observed through said eyepiece;
   wherein at least one of said first reflecting mirror and said second reflecting mirror has a variable optical power, said at least one of said first reflecting mirror and said second reflecting mirror includes a reflecting surface, a quarter-wave plate disposed before said reflecting surface, and a liquid crystal cell comprising a liquid crystal disposed before said quarter-wave plate and sandwiched between transparent electrodes, said transparent electrodes being connected to an electric power source in which a voltage in which a voltage is variable, so that the light directed toward said one reflecting mirror traverses said liquid crystal cell and said quarter-wave plate, is reflected from said reflecting surface, traverses said quarter-wave plate and said liquid crystal cell, and emerges from said one reflecting mirror.

2. A real image mode finder optical system, comprising:
   an objective lens;
   a first reflecting mirror reflecting light coming from said objective lens;
   a second reflecting mirror reflecting the light reflected from said first reflecting mirror in a direction substantially parallel with an optical axis of said objective lens; and
   an eyepiece disposed in a path of light reflected from said second mirror, so that an image formed by said objective lens is observed through said eyepiece;
   wherein at least one of said first reflecting mirror and said second reflecting mirror has a variable optical power, and said objective lens comprises, in order from an object side, a first lens unit having a negative refractive power, fixed on the optical axis, and a second lens unit having a positive refracting power, said second lens unit being movable along the optical axis when a change of magnification is made, a magnification of said objective lens changing with the movement of said second lens unit, an optical power of said one reflecting mirror changing with the movement along the optical axis of said second lens unit.

3. The optical system according to one of claims 1 or 2, wherein a position of the image of an object formed by said objective lens is shifted toward an object side when a magnification of said objective lens is changed from a wide position to a tele position by changing at least one distance between lens units included within said objective lens, and an optical power of said second reflecting mirror is variable.

4. The optical system according to one of claims 1 or 2, wherein a position of the image of an object formed by said objective lens is shifted toward an image side when a magnification of said objective lens is changed from a wide position to a tele position by changing at least one distance between lens units included within said objective lens, and an optical power of said first reflecting mirror is variable.

5. A real image mode finder optical system, comprising:
   an objective lens;
   a first reflecting mirror reflecting light coming from said objective lens;
   a second reflecting mirror reflecting the light reflected from said first reflecting mirror in a direction substantially parallel with an optical axis of said objective lens; and
   an eyepiece disposed in a path of light reflected from said second mirror, so that an image formed by said objective lens is observed through said eyepiece;
   wherein said first reflecting mirror and said second reflecting mirror each have a variable optical power; and
   wherein optical powers of said objective lens, said first reflecting mirror and said second reflecting mirror are determined so that a beam of light is substantially collimated in an optical path between said first reflecting mirror and said second reflecting mirror.

6. A real image mode finder optical system, comprising:
   an objective lens;
   a first reflecting mirror reflecting light coming from said objective lens;
   a second reflecting mirror reflecting the light reflected from said first reflecting mirror in a direction substantially parallel with an optical axis of said objective lens; and
   an eyepiece disposed in a path of light reflected from said second mirror, so that an image formed by said objective lens is observed through said eyepiece;
   wherein said first reflecting mirror and said second reflecting mirror each have a variable optical power; and
   wherein a position of the image of an object formed by said objective lens is shifted toward an object side when a magnification of said objective lens is changed from a wide position to a tele position by changing at least one distance between lens units included within said objective lens.

7. A real image mode finder optical system, comprising:
   an objective lens;
   a first reflecting mirror reflecting light coming from said objective lens;
   a second reflecting mirror reflecting the light reflected from said first reflecting mirror in a direction substantially parallel with an optical axis of said objective lens; and
   an eyepiece disposed in a path of light reflected from said second mirror, so that an image formed by said objective lens is observed through said eyepiece;
   wherein said first reflecting mirror and said second reflecting mirror each have a variable optical power; and
   wherein a position of the image of an object formed by said objective lens is shifted toward an image side when a magnification of said objective lens is changed from a wide position to a tele position by changing at least one distance between lens units included within said objective lens.

* * * * *